United States Patent
Ho et al.

(10) Patent No.: US 6,578,082 B1
(45) Date of Patent: Jun. 10, 2003

(54) DISTRIBUTED FLOW CONTROL SYSTEM AND METHOD FOR GPRS NETWORKS BASED ON LEAKY BUCKETS

(75) Inventors: Joseph S. Ho, Dallas, TX (US); Yixin Zhu, Plano, TX (US); Mark Eric Hanson, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/365,669

(22) Filed: Aug. 2, 1999

(51) Int. Cl.$^7$ .................................................. H04J 3/16
(52) U.S. Cl. ...................... 709/233; 709/234; 709/235; 370/230; 370/235
(58) Field of Search .................................. 709/233, 234, 709/235; 370/231, 232, 233, 234, 235, 229, 230

(56) References Cited

U.S. PATENT DOCUMENTS

| | | | | |
|---|---|---|---|---|
| 5,596,576 A | * | 1/1997 | Milito | 370/232 |
| 5,646,943 A | * | 7/1997 | Elwalid | 370/230 |
| 5,796,956 A | * | 8/1998 | Jones | 709/233 |
| 5,959,991 A | * | 9/1999 | Hatono et al. | 370/235.1 |
| 6,167,027 A | * | 12/2000 | Aubert et al. | 370/230 |
| 6,374,112 B1 | * | 4/2002 | Widegren et al. | 370/352 |

OTHER PUBLICATIONS

*Digital Cellular Telecommunications System (Phase 2+); General Packet Radio Service (GPRS); Base Station System (BSS)–Serving GPRS Support Node (SGSN); BSS GPRS Protocol (BSSGP) (GSM 08.18 version 6.2.0 Release 197)*, ETSI, Technical Specification, Global System For Mobile Communication, Oct. 1998, p. 28, section 8.2.3.

Ouyang Y. C. et al., *Multiple Leaky Buckets With Buffer Sharing For MPEG Video In ATM Networks*, Proceedings of ICATM '98, Colmar, France, Jun. 24, 1996–Jun. 22, 1998, pp. 107–113.

Ho J. S. M. et al, *Cooperating Leaky Bucket for Average Rate Enforcement of VBR Video Traffic in ATM Networks*, Proceedings of INFOCOM '95, Boston, MA, vol. 3, Apr. 2–6, 1995, pp. 1248–1255.

* cited by examiner

*Primary Examiner*—Zarni Maung
*Assistant Examiner*—Wen-Tai Lin
(74) *Attorney, Agent, or Firm*—John D. Crane; Bracewell & Patterson, L.L.P.

(57) ABSTRACT

A distributed flow control system and method for GPRS networks to control and regulate data flow between multiple sources and a single destination within a GPRS network. The present system and method ensures the departing traffic from all of the sources conforms to the peak and average rate requirements that have been set forth by the BSS/PCU. A leaky bucket flow control mechanism is used at each respective one of the multiple sources for controlling flow of data from each respective source to the single destination. A maximum bucket size of a leaky bucket and a bucket leak rate are defined for each leaky bucket flow control mechanism. A multiplier (L) is estimated and determined for each respective source based on recent data arrival behaviors of the multiple sources. When a frame of the data is sent from the respective source to the single destination, a number of bytes equal to the size of the transmitted frame times the multiplier L is added to the leaky bucket.

14 Claims, 11 Drawing Sheets

Regular Leaky Bucket

B = current bucket level
$B_{max}$ = bucket size
L = leak rate
Tc = current time
Tp = time when the last LLC frame was sent
K = size of the LLC frame to be transmitted
B' = expected bucket level if the LLC frame is sent
* Note that Tc is the current time which keeps increasing.

Fig. 11 Distributed Leaky Bucket $i$

The only difference compared to the regular leaky bucket is that $L_{i,j}$ is used in the second box.
A subscript $i$ means that this variable is for leaky bucket $i$.

US 6,578,082 B1

DISTRIBUTED FLOW CONTROL SYSTEM AND METHOD FOR GPRS NETWORKS BASED ON LEAKY BUCKETS

BACKGROUND OF THE INVENTION

1. Technical Field

The present invention relates in general to a distributed flow control system and method for General Packet Radio Service (GPRS) networks and in particular to a system and method for adapting a leaky bucket mechanism to a system having multiple traffic sources wherein the combined traffic from all sources must satisfy a single set of peak and average rate requirements.

2. Description of the Related Art

Figure 1:
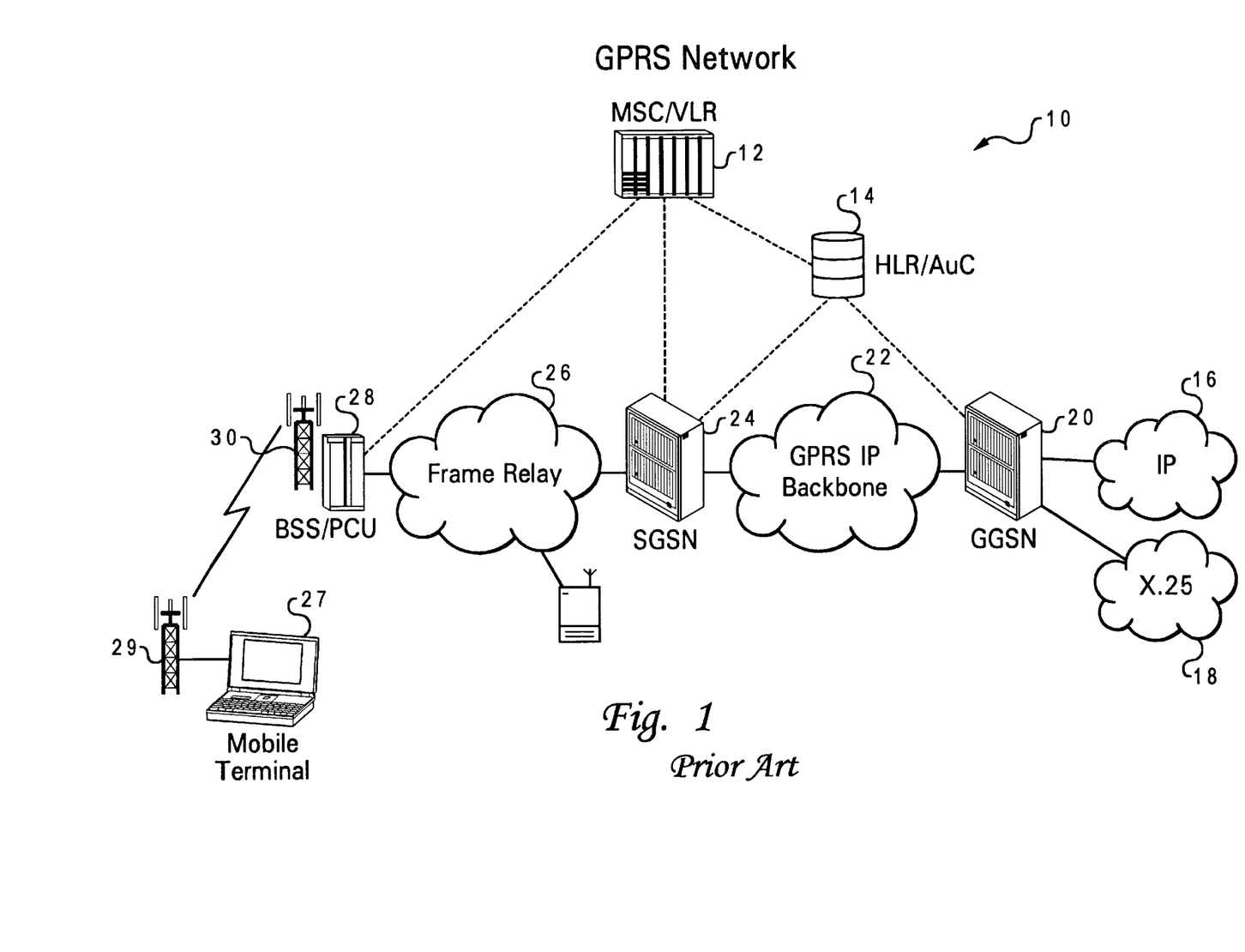
FIG. 1 is a prior art block diagram of a GPRS network.

Wireless communication technologies require the use of various defined standards such as for voice and data communications. General Packet Radio Service (GPRS) is a relatively newer version standard that has been established for wireless data communications in Europe, and GPRS is able to be used anywhere in the world. A general prior art diagram of the topology of a GPRS network 10 is shown in FIG. 1. The GPRS network 10 generally comprises a number of nodes. The GPRS network 10 comprises a mobile switching center (MSC), a visitor location register (VLR) 12, a home location register (HLR), an authentication center (AuC) 14, a gateway GPRS support node (GGSN) 20, a serving GPRS support node (SGSN) 24, a base station system (BSS) having an antenna 30, and a packet control unit (PCU) 28. The MSC/VLR provides voice communications for wireless or cellular telephones. The MSC/VLR 12 is in direct communications with the HLR/AuC 14, the SGSN 24, and the BSS/PCU 28. The HLR/AuC 14 is in direct communications with SGSN 24 and GGSN 20.

The GPRS network 10 is configured to support interfaces to and from outside packet data networks. FIG. 1 shows that the GGSN 20 is coupled to and in communications with outside packet data networks that support the internet protocol (IP) 16 or the X.25 protocol 18. In FIG. 1, data packets come in from the outside network (i.e. IP 16 or X.25 networks 18) to the GGSN 20, then to the SGSN 24, and then to the BSS/PCU 28. Thus, two way communications exist between the BSS/PCU 28 and the SGSN 24, the GGSN 20, and the outside network(s). One problem that exists for the data packet coming from the GGSN 20 (or outside) to the SGSN 24 and then to the BSS/PCU 28 is that the packet control unit (PCU) may have limited memory space. A long queue of incoming data may exist at the PCU, and the PCU may not be able to receive anymore data or information from the SGSN 24. Therefore, a method for regulating traffic flow from the SGSN to the PCU is necessary.

Figure 4:
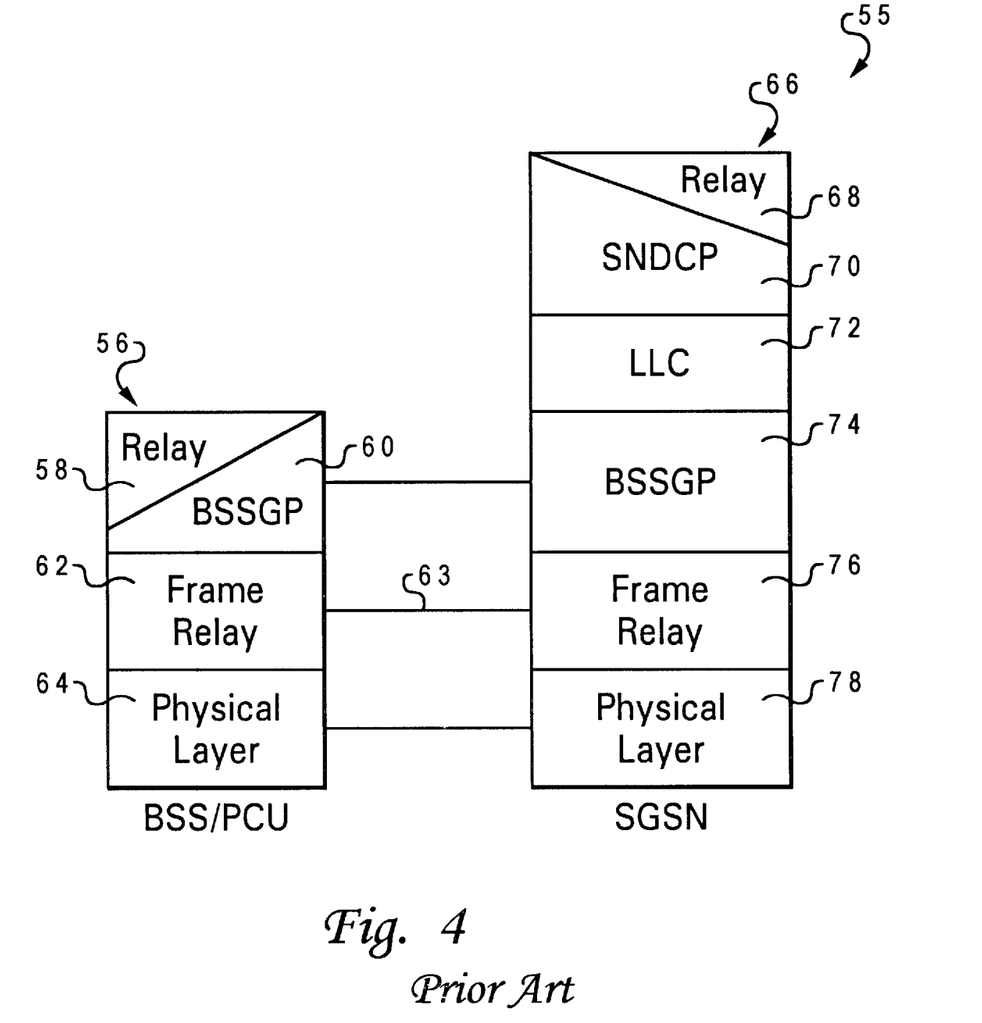
FIG. 4 is a prior art block diagram of a protocol stack between a BSS/PCU and a SGSN for the GPRS network.

FIG. 4 is a prior art block diagram of the protocol stack 55 between the BSS/PCU stack 56 for the BSS/PCU 28 and the SGSN stack 66 for the SGSN 24 in a GPRS network 10. The BSS/PCU stack 56 comprises a relay 58, a Base Station System GPRS protocol (BSSGP) layer 60, a frame relay layer 62, and a physical layer 64. The SGSN stack 66 comprises a relay 66, a SNDCP layer 70, a Logical Link Control (LLC) layer 72, a BSSGP layer 74, a frame relay layer 76, and a physical layer 78. According to the GPRS standards, a frame relay network 63 couples the BSS/PCU 28 to the SGSN 24. In the BSS/PCU stack 56, BSSGP layer 60 is located immediately above the frame relay layer 62. The operations of the BSSGP layer 60 include flow control and transmission of LLC frame 39 or data packet frame related information, such as routing and QoS requirements, between the SGSN 24 and the BSS/PCU 28. The data streams transmitted from the SGSN 24 to a cell is grouped together to form a BSSGP virtual circuit (BVC). Flow control between the SGSN 24 and the BSS/PCU 28 is performed both on per BVC and per mobile station basis.

Figure 2:
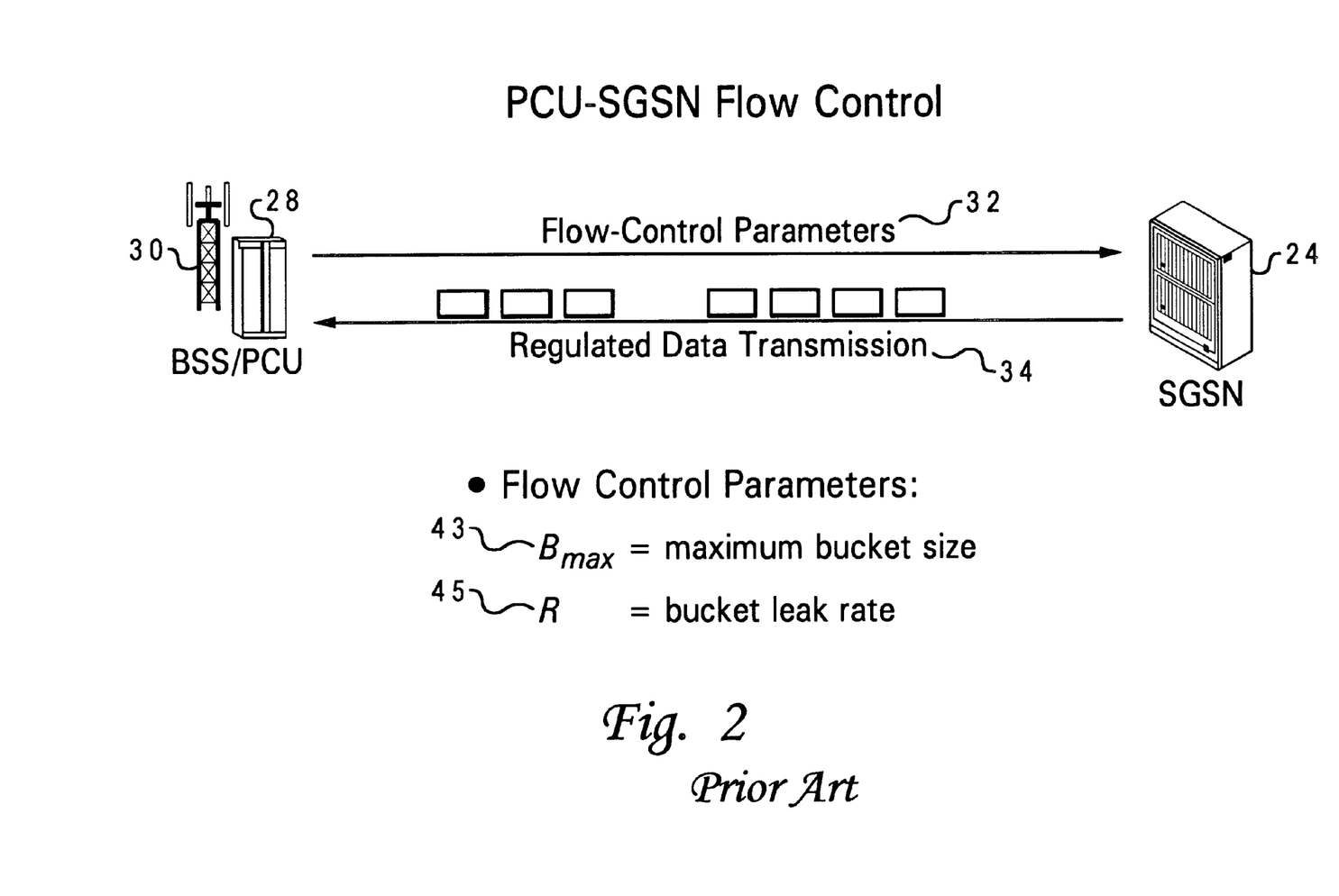
FIG. 2 is a prior art block diagram illustrating PCU-SGSN flow control for a GPRS network.

FIG. 2 shows a prior art diagram of the flow control between the SGSN 24 and the BSS/PCU 28. Flow control parameters 32 are programmed and established from the BSS/PCU 28. These flow control parameters 32 are directed from the BSS/PCU 28 to the SGSN 24 to control and regulate the flow of data from the SGSN 24 to the BSS/PCU 28. Thus, regulated data flow exists from the SGSN 24 to the BSS/PCU 28. The flow control mechanism implemented at the SGSN 24 is based on a leaky bucket flow control mechanism. The flow control parameters established by the BSS/PCU 28 are used to dimension the leaky bucket mechanism implemented at the SGSN 24.

The leaky bucket flow control mechanism is a simple and effective system and method for regulating and controlling traffic flow. Each leaky bucket is dimensioned by two parameters: leak rate (R) and bucket size (maximum bucket size $B_{max}$). These parameters together control the peak and the average rates of traffic departure from a traffic source. The leaky bucket flow control mechanism regulates the output bandwidth allocation to a traffic source such that traffic departing from the controlled source does not exceed the specified mean and peak rate values. The basic concept of this mechanism is to associate a bucket 40 with a traffic source at the SGSN 24 (see FIG. 3). The bucket 40 has a finite number of bytes in size (i.e. maximum bucket size $B_{max}$). When the traffic source at the SGSN 24 transmits traffic to the output link 80, an equivalent number of bytes must be put into the bucket 40. If the bucket 40 is full, transmission is not allowed. The available data 39 is either queued in the buffer 38 or discarded. Consequently, the traffic source at the SGSN 24 is not able to transmit more data 39 than the available capacity of the bucket 40. At the same time, the bucket 40 "leaks"(i.e. the bucket level drops) at a given leak rate R such that the data departure is not totally confined to the finite bucket size. Based on the leaky bucket mechanism, the mean departure rate of the traffic source at the SGSN 24 cannot exceed the bucket leak rate R. At any time instant, the traffic source at the SGSN 24 is not able to send out more data 39 than the bucket size $B_{max}$.

An application of the leaky bucket flow control mechanism 36 (see FIG. 3) is found in GPRS as specified in the European Telecommunications Standards Institute (ETSI) Global System for Mobile Communications (GSM) phase 2+ standards [1]. GPRS is the packet data extension of the circuit based GSM wireless communication standard. Details and applications of these standards and specifications are disclosed in ETSI, "Digital Cellular Telecommunications System (phase 2+); General Packet Radio Service (GPRS); Service Description; Stage 2," ETSI GSM 03.60, Version 6.1.1, August 1998. These standards, specifications, and publications are incorporated by reference herein. Referring to FIG. 1 and as stated earlier, the GGSN node 20 is the interface between the GPRS network and the outside networks 16 or 18. The GGSN 20 is responsible for forwarding data packets to the appropriate SGSN 24 and to provide mobility, security, and billing related operations. The SGSN 24 is responsible for the buffering and delivery of packet data and the handling of GPRS related signaling messages for subscribers residing in its assigned area. Each SGSN 24 is connected to one or more BSS/PCU 28. The BSS/PCU 28 is responsible for interfacing with the mobile station or terminal 27 with antenna 29 through the GPRS air interface protocol.

Figure 3:
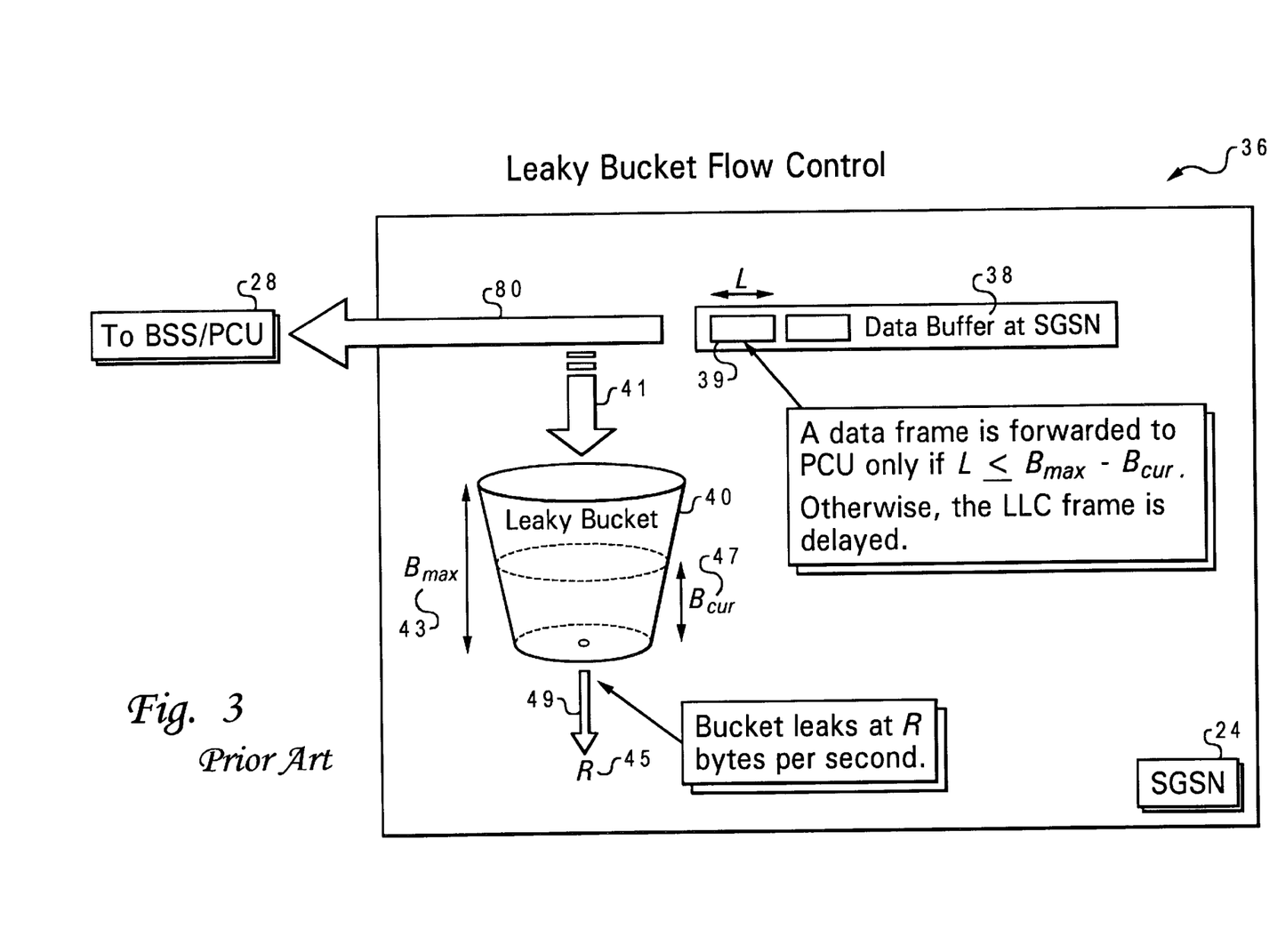
FIG. 3 is a prior art block diagram illustrating leaky bucket flow control for a GPRS network.

FIG. 3 shows a prior art diagram of the leaky bucket flow control mechanism 36. As a logical link control (LLC) frame of data 39 is forwarded from the data buffer 38 of the SGSN 24 to the BSS/PCU 28 via a BSSGP virtual circuit. A number of bytes equal to the length of the LLC frame must be placed in the bucket 40. In other words, the same amount of data 39 that has been forwarded from the SGSN 24 to the BSS/PCU 28 needs to be placed into the bucket 40. The data 39 collected in the bucket 40 leaks at the leak rate (R) 45. The data 39 leaking from the bucket 40 operates to control the rate of data flow from the SGSN 24 to the BSS/PCU 28 by requiring that a sufficient amount of space (equal to the size of the next LLC frame to be transmitted) in the leaky bucket 40 needs to exist before the SGSN 24 can further send data to the BSS/PCU 28. The level of the bucket 40 needs to drop (i.e. "leak") below some level or amount before a next LLC frame 39 or data packet can be sent from the SGSN 24 to the BSS/PCU 28. If the bucket 40 is full or would overflow if a next LLC frame 39 is sent, then the next LLC frame 39 is delayed. In other words, a next LLC frame 39 or data frame is forwarded from the SGSN 24 to the BSS/PCU 28 via a BSSGP virtual circuit only if the length (L) of the next LLC frame 39 is less than or equal to the difference between the maximum bucket size ($B_{max}$) 43 and the current bucket level ($B_{cur}$) 47, or otherwise, the next LLC frame 39 is delayed.

According to the GPRS standards, the leaky bucket flow control mechanism 36 is used to regulate traffic flow through a BVC from the SGSN 24 to the BSS/PCU 28. A feedback control scheme is then employed to set up the parameters of the leaky bucket at the SGSN 24. According to this method, each BSS/PCU 28 periodically sends to the SGSN 24 the leaky bucket parameter for each BVC supported by the BSS/PCU 28. The leaky bucket parameters include the maximum bucket size and the leak rate, which are determined based on the current congestion condition at the BSS/PCU 28 and the behavior of the air channels. The leaky bucket mechanism implemented at the SGSN 24 then controls the departing traffic of the BVC based on these parameters. FIG. 3 shows various components involved in the BVC flow control.

Figure 5:
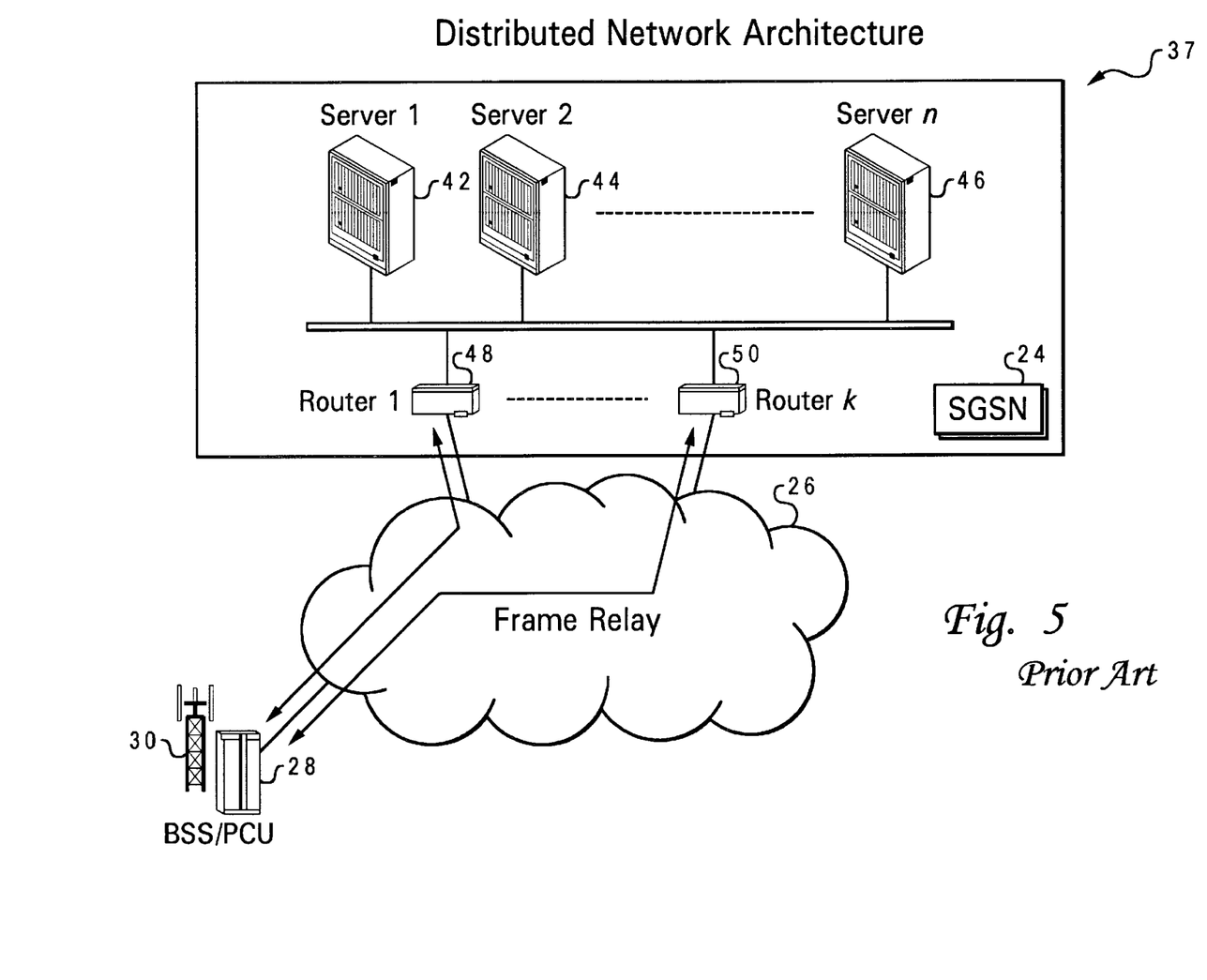
FIG. 5 is a prior art diagram illustrating the problems associated with a distributed network architecture with multiple sources on the SGSN side of a GPRS network.

A main problem arises when multiple sources belonging to the same BVC exist at the SGSN side of the GPRS network 10. The difficulty arises when the leaky bucket flow control mechanism 36 is adapted to the situation where multiple sources exist at the SGSN side of the GPRS network 10. For example, a distributed network architecture 37 is shown in FIG. 5. The distributed network architecture 37 shows data transferred between a SGSN 24 having within it multiple source servers (i.e. server1 42, server2 44, . . . servern 46) in communication with routers or routing boxes (i.e. router 1 48 . . . router k 50). The routers, in turn, are in communication with the frame relay 26 wherein the frame relay 26 is a public data network (which is similar to the Internet network). The frame relay 26, in turn, is in communication with the single destination BSS/PCU 28. FIG. 5 shows the problem from the configuration where the multiple sources are multiple routers within the SGSN 24. However, the problem is not limited to multiple sources that are multiple routers. The multiple sources may be multiple source servers, multiple SGSNs 24, and/or any other type(s) of multiple source(s) in any systems other than GPRS.

In other words, the setup in FIG. 5 is where a BVC is split across at multiple hardware interface cards or multiple SGSNs 24. The setup for this type of hardware/network architecture is preferable since it achieves higher reliability and enhances nodal or network capacity. Thus, it is necessary to ensure that the total traffic entering the BVC from all interface cards or SGSNs 24 adhere to the leaky bucket parameters as provided by the BSS/PCU 28.

One simple solution would be to implement a leaky bucket mechanism 36 at each BVC terminating point. However, since the BSS/PCU 28 is limited to providing only one set of leaky bucket parameters for controlling data flow, the issue becomes how to dimension all of the leaky buckets 36 using only one set of parameters to provide flow control of data. Therefore, a first simple solution to the multiple leaky bucket dimensioning problem is to dimension all of the leaky buckets to the same set of parameters, that is, dimension all leaky buckets using the same bucket size and leak rate. A second solution would be to have the leak rate divided among all of the leaky buckets and use the same bucket size for all leaky buckets. A third solution would be to have the bucket size divided among all leaky buckets and use the same leak rate for all leaky buckets. However, all of these solutions or attempted solutions either fail to enforce the required peak and average rates (i.e. first solution failure) or are overly restrictive such that the allowable peak and average rates cannot be achieved (i.e. second and third solutions failures).

Another solution for ensuring peak and average rates would be to provide a centralized leaky bucket mechanism that regulates the data traffic from all of the individual routers. The centralized leaky bucket mechanism would be provided by adding another box or hardware that collects data from all of the individual routers. However, the adding of an additional box or hardware is not desired due to space, cost, and other such issues that arise from utilizing additional hardware.

It would therefore be advantageous and desirable to provide a distributed flow control system and method for GPRS networks to control and regulate data flow between multiple sources exist at the SGSN side of the GPRS network and a single destination at the BSS/PCU side of the GPRS network. It would also be advantageous and desirable to provide such a distributed flow control system and method for GPRS networks to ensure the total departing traffic from all of the sources conforms to the peak and average rate requirements that have been set forth by the BSS/PCU. It would further be advantageous and desirable to provide such a distributed flow control system and method for GPRS networks that dimension all of the leaky bucket mechanisms using only one set of parameters to provide flow control of data traffic. It would still further be advantageous and desirable to provide such a distributed flow control system and method for GPRS networks that avoids using an additional box or hardware for being able to implement the leaky bucket flow control mechanism when multiple sources exist at the SGSN side of the GPRS network.

SUMMARY OF THE INVENTION

It is therefore one object of the present invention to provide a distributed flow control system and method for GPRS networks to control and regulate data flow between multiple sources exist at the SGSN side of the GPRS network and a single destination at the BSS/PCU side of the GPRS network.

It is another object of the present invention to provide such a distributed flow control system and method for GPRS networks to ensure the total departing traffic from all of the sources conforms to the peak and average rate requirements that have been set forth by the BSS/PCU.

It is a further object of the present invention to provide such a distributed flow control system and method for GPRS networks that dimension and factor all of the leaky bucket mechanisms using only one set of parameters to provide flow control of data.

It is still a further object of the present invention to provide such a distributed flow control system and method for GPRS networks that avoids using an additional box or hardware for being able to implement the leaky bucket flow control mechanism when multiple sources exist at the SGSN side of the GPRS network.

The foregoing objects are achieved as is now described. A distributed flow control system and method for GPRS networks to control and regulate data flow between multiple sources and a single destination within a GPRS network. The present system and method ensures the departing traffic from all of the sources conforms to the peak and average rate requirements that have been set forth by the BSS/PCU. A leaky bucket flow control mechanism is used at each respective one of the multiple sources for controlling flow of data from each respective source to the single destination. A maximum bucket size of a leaky bucket and a bucket leak rate are defined for each leaky bucket flow control mechanism. A multiplier (L) is estimated and determined for each respective source based on recent data arrival behaviors of the multiple sources. When a frame of the data is sent from the respective source to the single destination, a number of bytes equal to the size of the transmitted frame times the multiplier L is added to the leaky bucket. An additional frame of data is allowed to be sent from the respective source to the single destination if transmission of the data frame will not result in overflow of the leaky bucket. An additional frame of data is prohibited from being sent from the respective source to the single destination when transmission of the data frame will result in the overflow of the leaky bucket.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is a distributed flow control system and method for GPRS networks to control and regulate data flow between multiple sources exist at the SGSN side of the GPRS network and a single destination at the BSS/PCU side of the GPRS network. The present distributed flow control system and method for GPRS networks ensures the departing traffic from all of the sources conforms to the peak and average rate requirements that have been set forth by the BSS/PCU. The present distributed flow control system and method for GPRS networks dimension all of the leaky bucket mechanisms using only one set of leaky bucket parameters to control flow of data. The present distributed flow control system and method for GPRS networks avoids the use of an additional box or hardware for being able to implement the leaky bucket flow control mechanism when multiple sources exist at the SGSN side of the GPRS network.

Figure 6:
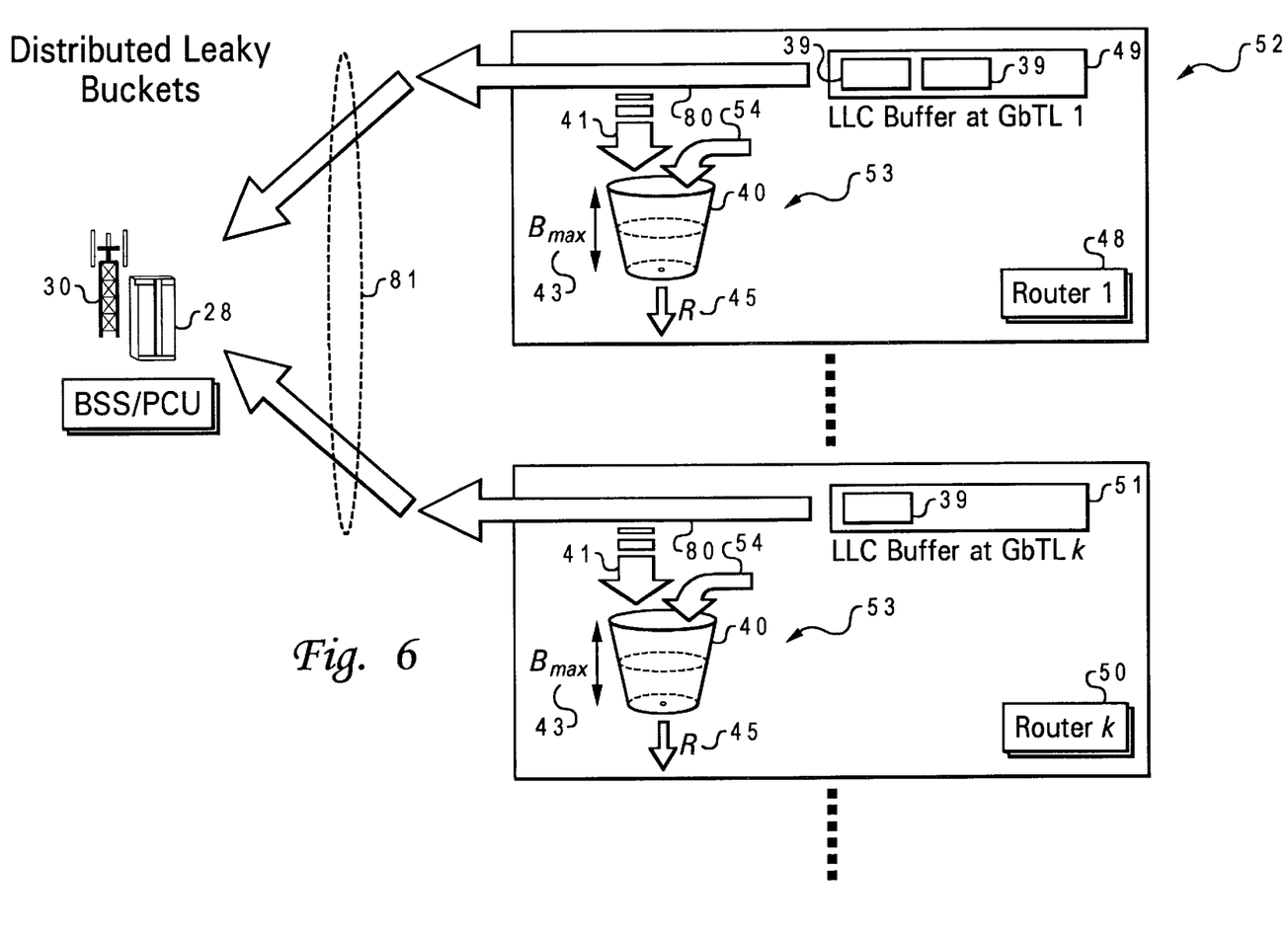
FIG. 6 is a block diagram illustrating the present invention distributed leaky bucket system and method for a GPRS network.
Figure 7:
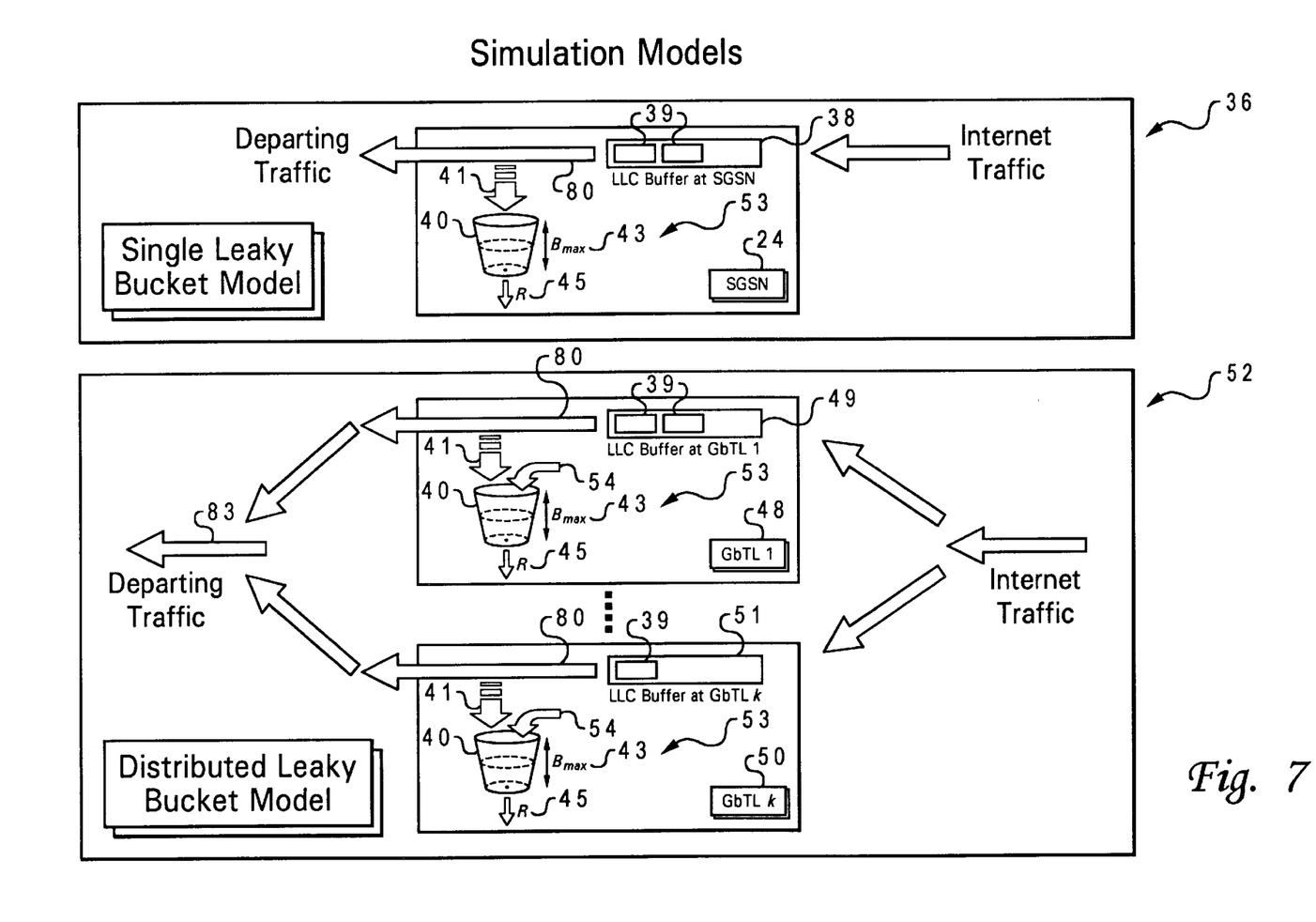
FIG. 7 is a diagram that compares a single leaky bucket model to the present invention distributed leaky bucket model.

The present distributed flow control mechanism 52 ensures that the combined departure traffic 83 from the traffic sources (i.e. from router 1 48, router k 50) satisfies one set of leaky bucket parameters. With reference now to the figures and in particular with reference to FIG. 6, the architecture of the present distributed flow control mechanism 52 is shown. The leaky bucket algorithm that was discussed earlier for prior art FIG. 3 is implemented and executed at each traffic source (i.e. router 1 48 to router k 50) or at each interface card. Each interface card is referred to as a leaky bucket controller (LBC). The same leaky bucket parameters exist at each traffic source. These parameters are the maximum bucket size ($B_{max}$) and the bucket leak rate (R). For the present invention, "k" is defined as the source k while "j" is defined as the time interval j. Each byte of data that a traffic source router k 50 transmits to the outgoing link 81 during time interval j, the traffic source must place $L_{k,j}$ bytes into its leaky bucket 40 of its LBC where $L_{k,j}$ reflects the estimated total departure traffic (measured in bytes) from all of the traffic sources (see FIG. 6) for each byte sent by router k. With reference now to the FIGS. and in particular with reference to FIG. 7, the prior art single leaky bucket mechanism 36 only places the same amount of frame size (FS) bytes transmitted from the traffic source to the outgoing link into the leaky bucket 40 in the LBC while the present distributed leaky bucket mechanism 52 places $L_{k,j}$ bytes into the leaky bucket 40 at the LBC of the traffic source. Wherein the $L_{k,j}$ bytes reflect the transmitted data from the traffic source and from all other traffic sources. For example, if it is estimated that for every byte transmitted by the traffic source k, during time interval j another n bytes will be transmitted by the other sources, then the value of $L_{k,j}$ should be set to n+1 bytes.

The present distributed flow control system 52 and method for a GPRS network 10 for controlling flow of data between multiple sources and a single destination within the GPRS network generally involves the following. A leaky bucket flow control mechanism 53 is used at each respective one of the multiple sources 48, 50, etc. for controlling the flow of the data 39 from each respective source (i.e. source 48, 50, etc.) to the single destination 28. A maximum bucket size $B_{max}$ of a leaky bucket 40 and a bucket leak rate R are defined for each leaky bucket flow control mechanism 53. A multiplier $L_{k,j}$ 39 is estimated and determined for each respective source k (where k=1,2 ...) 48, 50, etc. during time interval j based on arrival and queuing behaviors of the multiple sources 48, 50, etc. The number of bytes equal to $L_{k,j}$ is added into the leaky bucket k 40 when a byte of the data 39 is sent from the respective source k 48 or 50 to the single destination 28 during time interval j. An additional frame of data 39 is allowed to be sent from the respective source 48 or 50 to the single destination 28 when the respective leaky bucket 40 has sufficient empty space to store a number of bytes equal to the size of the data frame multiplied by $L_{k,j}$. An additional frame of data 39 is prohibited from being sent from the respective source 48 or 50 to the single destination 28 when there is not sufficient empty space in the leaky bucket to store the number of bytes equal to the size of the data frame times $L_{k,j}$.

At the end of each time interval, the traffic availability amount is estimated for each traffic source 48, 50, etc. for a next time interval. The traffic availability amounts for each of the traffic sources 48, 50, etc. are totaled together to provide a total traffic availability amount for all of the multiple sources 48, 50, etc. The total traffic availability amount is distributed to the leaky bucket 40 associated with each source 48, 50, etc.

In order to accurately estimate the value of $L_{k,j}$, the present distributed flow control mechanism 52 utilizes a synchronization procedure. The synchronization procedure periodically informs each leaky bucket 40 for each traffic source 48, 50, etc. or LBC of the traffic availability, during the next synchronization interval at the other source(s) every T seconds. This information is then used for the estimation of the $L_{k,j}$. This procedure allows each leaky bucket 40 to account for the departure behavior from its traffic source 48, 50, etc. and LBC and for all of the other traffic sources 48, 50, etc. and LBCs. The procedure provides each leaky bucket 40 with up-to-date traffic availability information at the other traffic sources and allows each traffic source to accurately regulate its departure traffic such that the combined departure traffic from all sources does not exceed the maximum allowed values.

Figure 8:
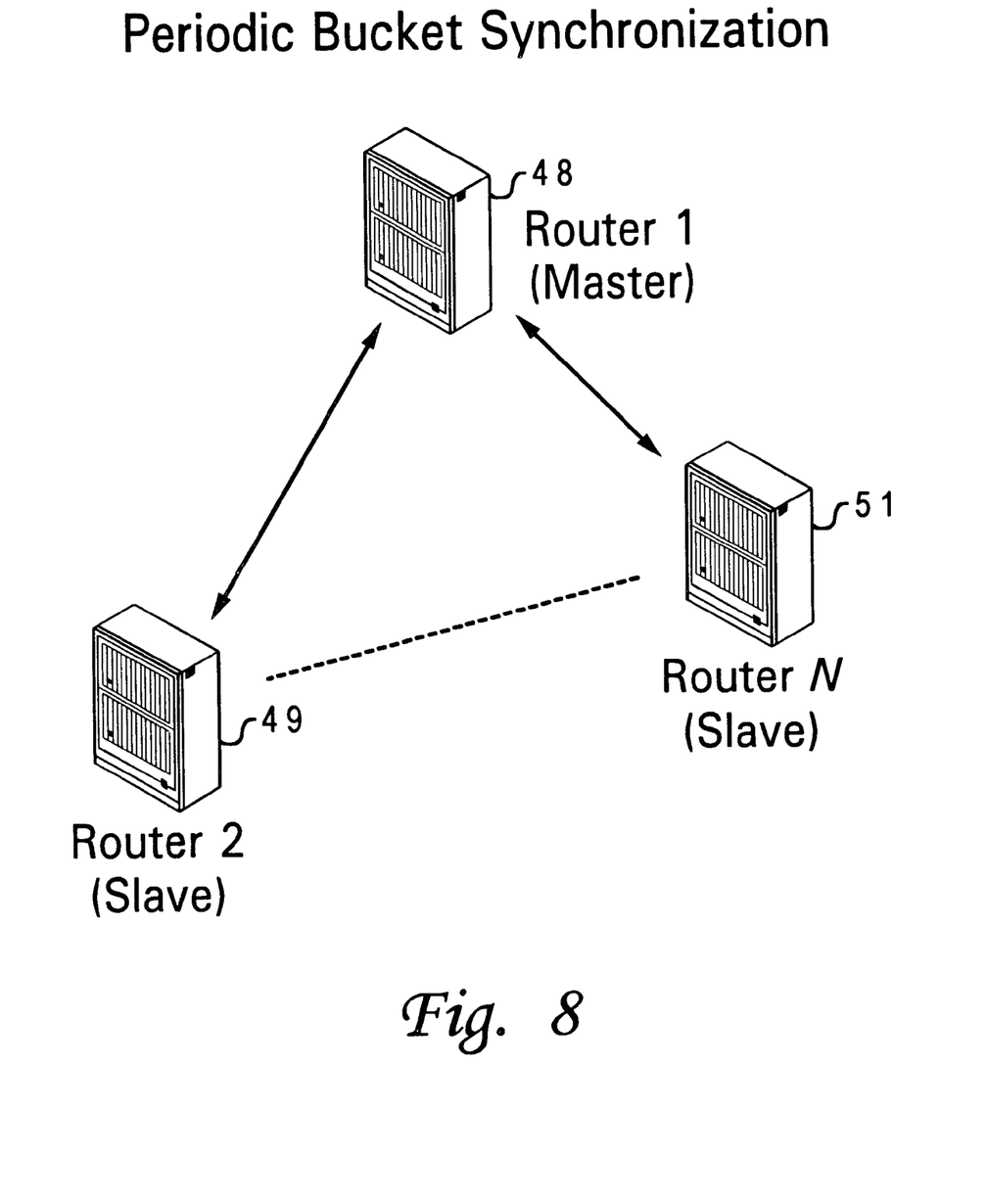
FIG. 8 is a block diagram that illustrates periodic bucket synchronization for the present invention.

The synchronization procedure may be implemented by many methods including: 1) a centralized or master/slave method and 2) a fully distributed method. The centralized method requires the designation of one of the leaky buckets 40 as a master while all of the other leaky buckets 40 are slaves. With reference now to the figures and in particular with reference to FIG. 8, the master/slave configuration is shown wherein the traffic source router 1 48 as designated with the master leaky bucket 40 while the traffic sources router 2 49 and router N 51 are designated as the slave leaky buckets 40. At the end of each synchronization interval, the slave leaky buckets 40 inform the master leaky bucket 40 of their estimated traffic availability from their associated traffic source for the next synchronization or time interval. The master leaky bucket 40 collects all of the estimated information from the slave leaky buckets 40 and then distributes the total estimated traffic availability from all leaky buckets 40 (including the master itself) to each of the slave leaky buckets 40. For example, a master leaky bucket 40 is designated, and the traffic availability amount for the next time interval from each leaky bucket 40 associated with a source 48, 50, etc. is sent to the master leaky bucket 40. These traffic availability values are totaled and determined at the master leaky bucket 40, and the total traffic availability amount is sent from the master leaky bucket 40 to each slave leaky bucket 40.

The centralized or master/slave method may suffer from reliability problems, particularly in the situation where an error or failure occurs at the master leaky bucket 40. Therefore, special safeguards must be put into place to ensure continued operations if the master leaky bucket 40 fails. The fully distributed method does not require centralized coordination. In the fully distributed method, each leaky bucket 40 broadcasts the estimated traffic availability to all leaky buckets 40 at the end of each synchronization or time interval. For example, the estimated traffic availability amount for the next time interval is sent from the leaky bucket 40 to each other leaky bucket 40. The traffic availability values of all leaky buckets are totaled and determined at each leaky bucket 40. However, the fully distributed method may generate relatively high volume of signaling traffic among the leaky buckets 40. Regardless of the selected method, when a leaky bucket 40 receives the traffic availability information, it will use this information to update the $L_{k,j}$ value for use during the next synchronization or time interval.

A number of different ways to estimate traffic availability exists. The present invention is not in any way limited to the specific ways of estimating traffic availability disclosed in this specification, and any suitable way or method for estimating traffic availability may be used. The present algorithm estimates the traffic availability based on two parameters: 1) the queue length at the end of the present synchronization or time interval and 2) the expected traffic arrival during the next synchronization or time interval.

A data traffic arrival count for a present time interval is determined for each traffic source 48, 50, etc., and a queue length at the end of the present time interval is determined at the leaky bucket 40 for each source 48, 50, etc. The data traffic arrival count for the present time interval and the queue length at the end of the present time interval are used to calculate an expected data traffic availability for a next time interval for each source 48, 50, etc. The expected data traffic availability for the next time interval is used to determine the multiplier $L_{k,j}$ for each source 48, 50, etc.

The multiplier $L_{k,j}$ for a source is set equal to an infinite value when the expected data traffic availability for the next time interval for that particular source equals zero. This setting is done so that any additional frame of data from that particular source is prohibited from being sent to the single destination for the next time interval. The multiplier $L_{k,j}$ for a source is set equal to a ratio of a total expected data traffic availability for the next time interval for all of the multiple sources 48, 50, etc. to expected data traffic availability for the next time interval for the particular source.

An algorithm is provided to illustrate the present system and method for estimating traffic availability. The algorithm assumes that M traffic sources exist. Also, for this algorithm, each leaky bucket must count the number of bytes that arrive during the synchronization interval, and $\lambda_{i,j}$ is defined as the value of the counter at the end of the synchronization interval. The counter is reset to zero (0) at the beginning of the next synchronization interval. The algorithm further defines $q_{i,j}$ as the queue length of the traffic source 48, 50, etc. or LBC i at the end of the synchronization interval j; $\lambda_{i,j}$ as the total traffic arrival at traffic source or LBC i during synchronization interval j; $a_{i,j+1}$ as the estimated total traffic arrival at LBC i during synchronization interval j+1; and $e_{i,j}$ as the estimated traffic availability at traffic source or LBC i during synchronization interval j. Where $1 \leq i \leq M$ and $j \leq 0$, the estimated traffic arrival during the next synchronization interval is according to the following equation AA:

$$a_{i,j+1} = \alpha * a_{i,j} + (1-\alpha) * \lambda_{i,j} \text{ if } j > 0$$

$$a_{i,j+1}=0 \text{ if } j=0.$$

α is the smoothing factor, and a value of 0.5 is recommended. Other values can be used depending on the system requirements. The value of $e_{i,j+1}$ or the estimated traffic availability for the next synchronization interval (synchronization interval j+1) is estimated at the end of each synchronization interval j according to the following equation A:

$$e_{i,j+1}=\min(q_{i,j}+a_{i,j+1},q_{th})$$

In determining the $e_{i,j+1}$ value, the estimated queue lengths $e_{i,j}$ are truncated at a $q_{th}$ value. In other words, if expected traffic is too high for a particular source, then allocation of output bandwidth resources is limited to a certain amount instead of allocating so much resources based on proportional amounts to that particular source. This truncation eliminates the undesirable effect of long queues on the performance of the proposed flow control mechanism. As an example, for a given leak rate L and a bucket size $B_{max}$, the maximum amount of data that is able to depart from a traffic source 48, 50, etc. within a synchronization interval of T seconds is $L*T+B_{max}$. As a result, a traffic source 48, 50, etc. with a queue that is longer than $L*T+B_{max}$ should not be given a larger output bandwidth allocation during the next synchronization or time interval compared to another queue with length equal to $L*T+B_{max}$. For the present distributed flow control mechanism, the $q_{th}$ value is obtained according to the following formula C:

$$q_{th}=L*T.$$

Each leaky bucket i (i.e. leaky bucket 40) calculates its estimated traffic availability, $e_{i,j+1}$ value at the end of each synchronization interval j and transmits it to the other leaky buckets 40 either directly or through a master leaky bucket 40. Upon receiving all $e_{i,j+1}$ values from the other leaky buckets 40, leaky bucket k (where $1 \leq k \leq M$) generates its $L_{k,j+1}$ value according to the following equation B:

$$L_{k,j+1}=M \text{ if } (\Sigma \text{ from } i=1 \text{ to } M \text{ of } e_{i,j+1})=0;$$

$$L_{k,j+1}=\infty \text{ if } e_{k,j+1}=0; \text{ and}$$

$$L_{k,j+1}=(\Sigma \text{ from } i=1 \text{ to } M \text{ of } e_{i,j+1})/e_{k,j+1} \text{ otherwise}.$$

$L_{k,j+1}=\infty$ means that the departure or transmission of data 39 from the traffic source or LBC k is not allowed for the next synchronization or time interval j+1.

Thus, $L_{k,j}$ is the leaky bucket parameter. For every byte that a traffic source sends out to the outgoing link, then $L_{k,j}$ bytes need to be placed into its leaky bucket 40. If sufficient space in the leaky bucket 40 does not exist, then the transmission of data 39 from the SGSN 24 to the BSS/PCU 28 must be delayed until the level of the leaky bucket 40 is lowered via leakage to an available space sufficient amount. Note that $L_{k,j}$ satisfies the following equation D for all values of j:

$$(\Sigma \text{ from } k=1 \text{ to } M \text{ of } 1/L_{k,j})=1.$$

Figure 9:
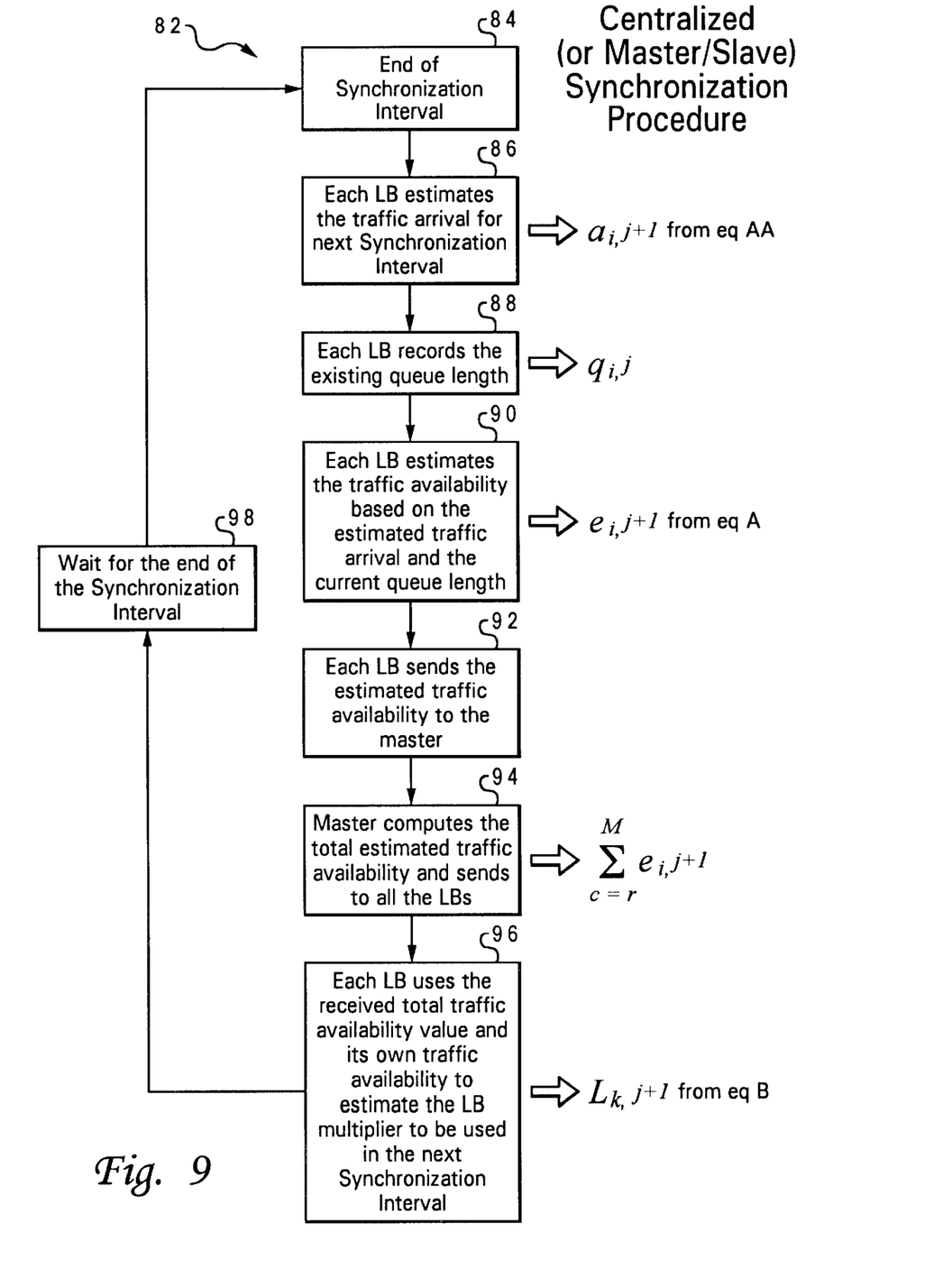
FIG. 9 is a flow chart of the centralized or master/slave synchronization procedure for the present invention.

FIG. 9 shows a flow chart for a centralized or master/slave synchronization procedure 82 for the present invention. The procedure 82 starts at an end of a synchronization interval at block 84. At block 86, each leaky bucket (LB) estimates the traffic arrival for the next synchronization interval (i.e. determination of $a_{i,j+1}$ from equation above). The procedure 82 moves to block 88 where each LB records the existing queue length (i.e. determination of $q_{i,j}$) Each LB estimates the traffic availability based on the estimated traffic arrival and the current queue length (i.e. determination $e_{i,j+1}$ from equations A and C above) at block 90. At block 92, each LB sends the estimated traffic availability to the master. The procedure 82 moves to block 94 where the master computes the total estimated traffic availability and sends this estimate to all of the leaky buckets (LBs) (i.e. determination of $\Sigma$ from i=1 to M of $e_{i,j+1}$). At block 96, each LB uses the received total traffic availability value and its own traffic availability to estimate the LB multiplier to be used in the next interval. The procedure 82 moves to block 98 where it waits for the end of the synchronization interval and loops back to block 84 where the procedure is repeated therefrom.

Figure 10:
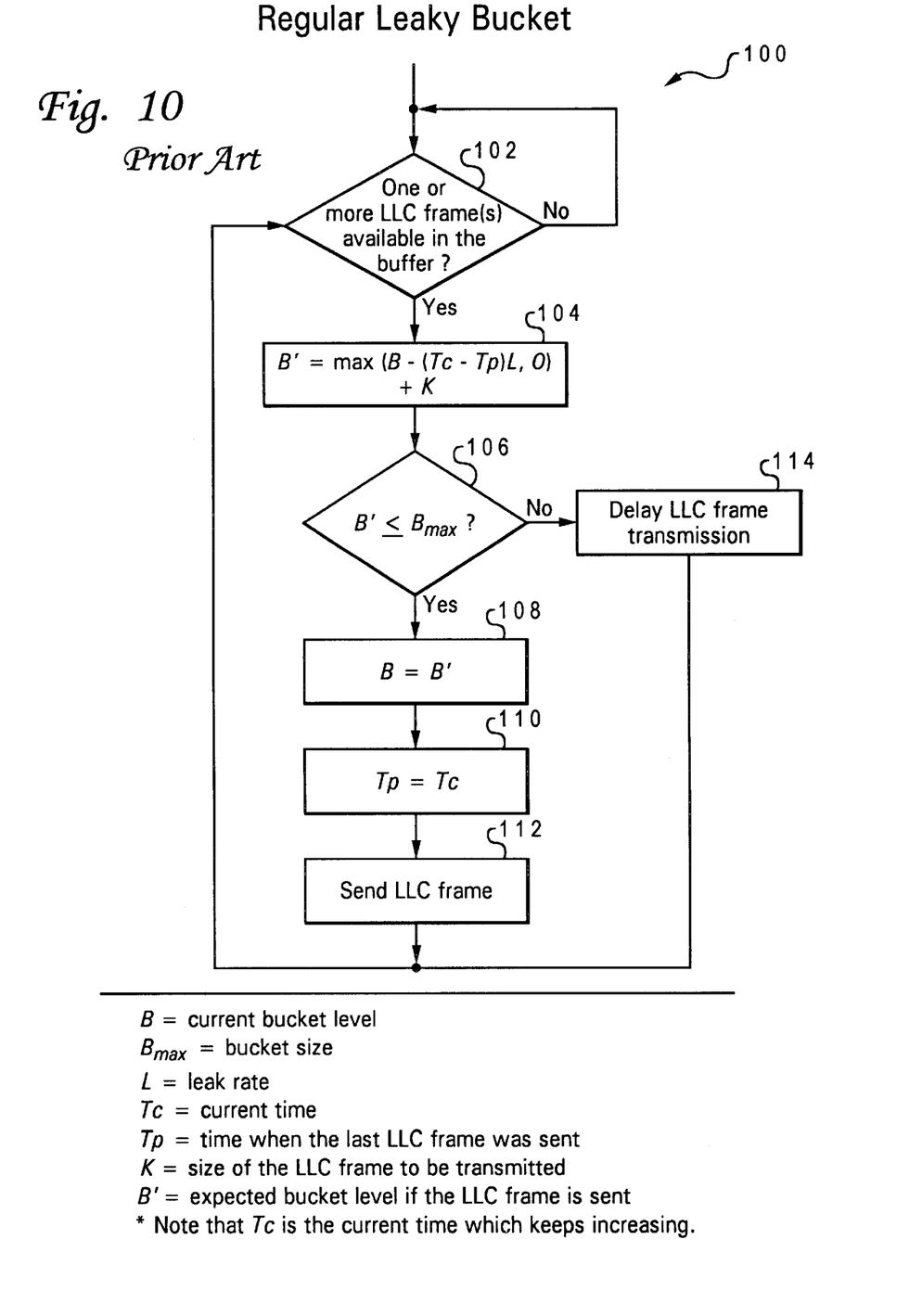
FIG. 10 is a flow chart for the implementation of a regular, prior art leaky bucket algorithm.

FIG. 10 shows a flow chart for the implementation of a regular, prior art leaky bucket algorithm 100. The algorithm 100 starts at decision block 102 where it is determined whether one or more LLC frame is available in the buffer. If such LLC frame is not available, then algorithm 100 continues to wait until such LLC frame is available. When such LLC frame is available, the algorithm 100 moves to block 104. At block 104, the expected bucket level (B') if the LLC frame is sent is determined. The expected bucket level (B') is calculated by taking the maximum of the difference value of the current bucket level (B) and the product of the difference of the current time ($T_c$) and the time when the last LLC frame was sent ($T_p$) and the leak rate (L) or the zero value and adding this determined maximum with the size of the LLC frame to be transmitted (K), that is, B'=max $(B-(T_c-T_p)L, 0)+K$. At decision block 106, the algorithm 100 determines whether the expected bucket level if the LLC frame is sent (B') is less than or equal to the bucket size ($B_{max}$). If B' is not less than or equal to $B_{max}$, then the algorithm 100 moves to block 114 where the LLC frame transmission is delayed, and the algorithm 100 then loops back to the decision block 102 to continue therefrom. However, if B' is less than or equal to the bucket size ($B_{max}$), then at block 108, the current bucket level (B) is set equal to the expected bucket level if the LLC frame is sent (B'). The algorithm 100 moves to block 110 where the time when the last LLC frame was sent ($T_p$) is set equal to the current time ($T_c$). $T_c$ is the current time which continuously keeps increasing. The algorithm 100 moves to block 112 where the LLC frame is sent, and the algorithm 100 loops back to decision block 102 to continue therefrom.

Figure 11:
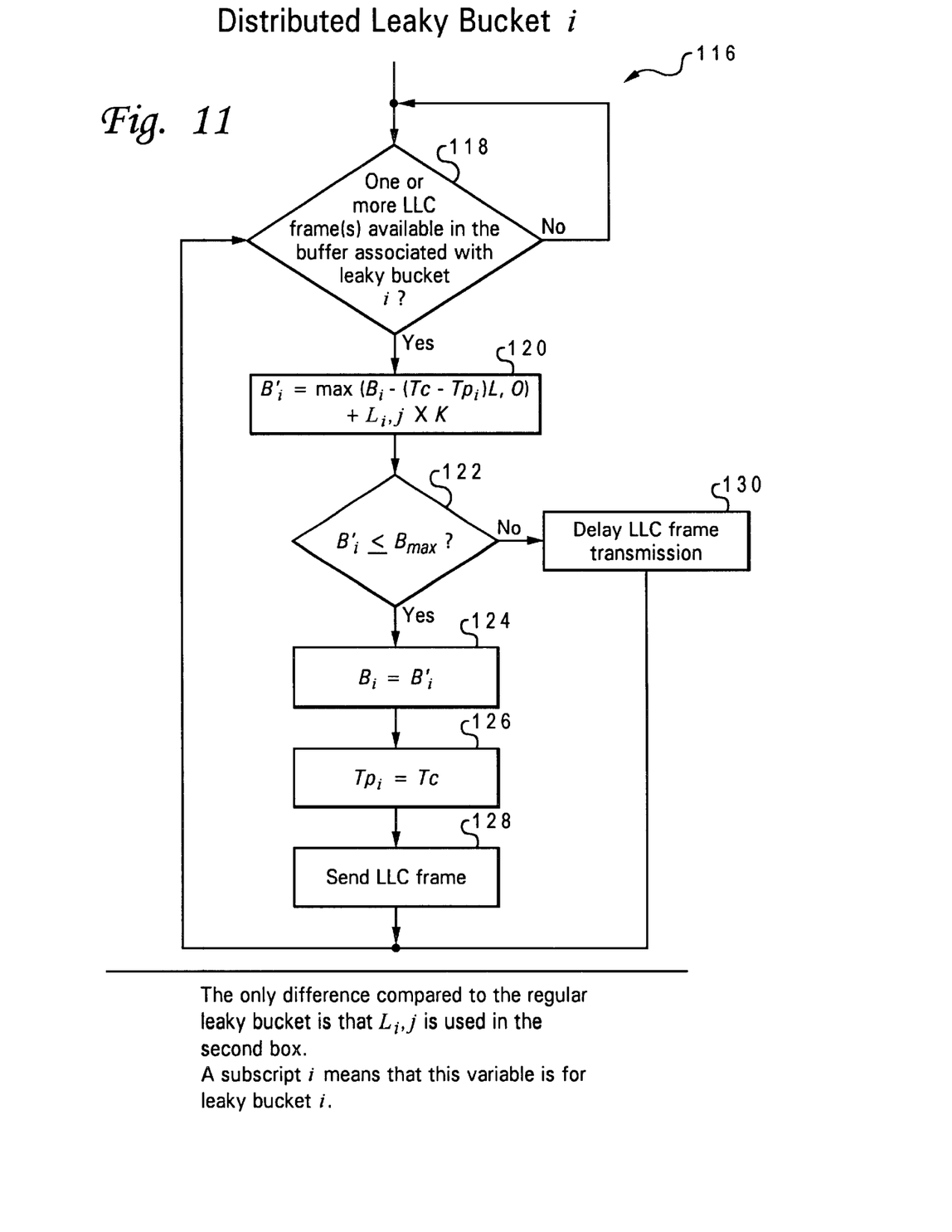
FIG. 11 is a flow chart for the implementation of a distributed leaky bucket algorithm for the present invention.

FIG. 11 shows a flow chart for the implementation of a distributed leaky bucket algorithm 116 for the present invention. The algorithm 116 is the same as the algorithm 100 except for a couple key differences. The blocks 118, 120, 122, 124, 126, 128, and 130 for algorithm 116 are similar and respectively parallel the block 102, 104, 106, 108, 110, 112, and 114 for algorithm 100. However, the algorithm 116 have subscript i designations in the various blocks while algorithm 100 does not have such designations. The subscript i by a variable means that the variable is for leaky bucket i. Also, the $L_{i,j}$ is used in the second block 120 for algorithm 116 to calculate the expected bucket level if the LLC frame is sent (B') as compared with it not being used in the second block 104 for algorithm 100.

The present invention system and method discloses a leaky bucket flow control system and method for a GPRS network 10 for controlling flow of data 39 between multiple sources 48, 50, etc. and a single destination 28 within the GPRS network 10 is disclosed. A leaky bucket flow control mechanism 53 is provided at each of the multiple sources 48, 50, etc. for controlling the flow of the data 39 from each source 48, 50, etc. to the single destination. A maximum bucket size $B_{max}$ of a leaky bucket 40 and a bucket leak rate R are defined for each leaky bucket flow control mechanism 53. A leaky bucket multiplier is estimated and determined for each source 48, 50, etc. based on departure behaviors of the multiple sources 48, 50, etc. The estimated data availability for the next time interval is collected from each leaky bucket 40 and totaled together to determine a total estimated data availability for the next time interval. The total estimated data availability is communicated to each leaky bucket 40 which is then used to calculate the leaky bucket multiplier. A number of bytes equal to the multiplier times the frame size is added to a leaky bucket 40 when a frame of data 39 is sent from the respective source for that leaky bucket 40 to the single destination 28. A frame of data 39 is allowed to be sent from the respective source 48, 50, etc. to the single destination 28 if the respective leaky bucket 40 will not overflow after the transmission of the frame, and a frame of data 39 is prohibited from being sent from the respective source 48, 50, etc. to the single destination 28 if the respective leaky bucket 40 will overflow after the transmission of the frame.

The present invention also discloses a distributed flow control system 52 for a GPRS network 10 for controlling flow of data 39 between multiple sources 48, 50, etc. and a single destination 28 within the GPRS network 10. The system 52 generally comprises a leaky bucket flow control mechanism 53 associated with each of the multiple sources 48, 50, etc. for respectively controlling the flow of the data 39 from each source 48, 50, etc. to the single destination 28. The leaky bucket has a maximum bucket size $B_{max}$ and has an associated bucket leak rate R at which the data 39 leaks from the leaky bucket. The distributed leaky bucket flow control mechanism 53 estimates and determines a leaky bucket multiplier for each source 48, 50, etc. based on arrival and queuing behaviors of the multiple sources 48, 50, etc. It also adds a number of bytes equal to the multiplier times the transmitted frame size into the leaky bucket when a frame of the data 39 is sent from the respective source 48, 50, etc. to the single destination 28. The leaky bucket mechanism 53 allows an additional frame of data 39 to be sent from the respective source 48, 50, etc. to the single destination 28 if the respective leaky bucket 40 will not overflow after the transmission of the frame and prohibits an additional frame of data 39 from being sent from the respective source 48, 50, etc. to the single destination 28 if the respective leaky bucket 40 will overflow after the transmission of the frame.

While the invention has been particularly shown and described with reference to a preferred embodiment, it will be understood by those skilled in the art that various changes in form and detail may be made therein without departing from the spirit and scope of the invention.

What is claimed is:

1. A distributed flow control method for controlling flow of data between multiple sources and a single destination within a GPRS network, said method comprising the steps of:

using a leaky bucket flow control mechanism having a leaky bucket with a maximum bucket size and a bucket leak rate at each respective one of the multiple sources for controlling the flow of the data from the multiple sources to the single destination, estimating a traffic availability for the leaky bucket at each of the multiple sources for a next time interval based on arrival and queuing behaviors of each of the multiple sources, determining a total traffic availability for the next time interval by collecting and totaling a traffic availability from each of the multiple sources, allowing an additional data frame to be sent to the single destination from those of the multiple sources at which the leaky bucket will not overflow based on the estimated traffic availability after sending the additional data frame in the next time interval, prohibiting an additional data frame from being sent to the single destination from those of the multiple sources at which the leaky bucket will overflow based on the estimated traffic availability after sending the additional data frame in the next time interval, and at each of those multiple sources sending an additional data frame, adding a number of bytes of data to the leaky bucket equal to a size of the additional data frame multiplied by a respective leaky bucket multiplier greater than 1, wherein the respective leaky bucket multiplier of each source is calculated based upon said total traffic availability for the next time interval.

2. The method according to claim 1, and further comprising:

communicating the total traffic availability to each of the multiple sources, and using the total traffic availability to calculate a leaky bucket multiplier for the next time interval.

3. The method according to claim 2, wherein:

said method further comprises:

designating a master source among the multiple sources, sending the traffic availability for the next time interval from each of the multiple sources to the master source, said determining comprises said master source totaling the traffic availability for all of the multiple sources, and said communicating comprises the master source sending the total traffic availability to each of the other multiple sources.

4. The method according to claim 2, wherein said determining further comprises the steps of:

sending an individual traffic availability for the next time interval from each source to each other of the multiple sources, and each source among the multiple sources individually totaling the individual traffic availabilities to determine the total traffic availability of all of the multiple sources.

5. The method according to claim 1, wherein estimating a traffic availability comprises:

recording a traffic arrival amount for a present time interval at the leaky bucket, recording an existing queue length at the leaky bucket, estimating a traffic availability for a next time interval at the leaky bucket based on the traffic arrival amount and the existing queue length.

6. A leaky bucket flow control method for controlling flow of data between multiple sources and a single destination within a GPRS network, said method comprising the steps of:

providing a leaky bucket flow control mechanism at each of the multiple sources for controlling the flow of the data from the multiple sources to the single destination, defining a maximum bucket size of a leaky bucket and a bucket leak rate for the leaky bucket flow control mechanism of the each of the multiple sources, estimating a traffic availability for the leaky bucket at each of the multiple sources, collecting and totaling the traffic availability from the leaky bucket at each of the multiple sources to determine a total estimated traffic availability, communicating the total estimated traffic availability to the leaky bucket at each of the multiple sources, using the total estimated traffic availability and the respective traffic availability to determine a leaky bucket multiplier for the respective leaky bucket at each of the multiple sources, and using the leaky bucket multiplier in a next time interval to determine whether an additional data frame is to be sent from each of the multiple sources to the single destination in the next time interval.

7. The method according to claim 6, further comprising the steps of:

allowing an additional data frame to be sent to the single destination from each of those sources at which the respective leaky bucket will not overflow after sending the additional data frame in the next time interval, and prohibiting the additional data frame from being sent to the single destination from each of those sources at which the respective leaky bucket will overflow after sending the additional data frame in the next time interval.

8. The method according to claim 7, further comprising the step of:

adding a number of bytes equal to the leaky bucket multiplier times a size of the additional data frame to the leaky bucket at each of the multiple sources when the additional data frame is sent from a respective one of the multiple sources to the single destination.

9. A distributed flow control system for controlling flow of data between multiple sources and a single destination within a GPRS network, said system comprising:

a respective leaky bucket flow control mechanism at each of the multiple sources for controlling the flow of the data from the multiple sources to the single destination, said leaky bucket flow control mechanism including a leaky bucket having a maximum buffer size and an associated bucket leak rate at which the data are transmitted from the leaky bucket, wherein the leaky bucket flow control mechanism at each of the multiple sources estimates a leaky bucket multiplier for its leaky bucket for a next time interval based on arrival and queuing behaviors of all of the multiple sources, adds to the leaky bucket a number of bytes equal to the leaky bucket multiplier multiplied by a size of an additional data frame if the additional data frame is sent, allows the additional data frame to be sent to the single destination if its leaky bucket will not overflow based on the estimated leaky bucket multiplier after sending the additional data frame in the next time interval, and prohibits the additional data frame from being sent to the single destination if its leaky bucket buffer will overflow based on the estimated leaky bucket multiplier after sending the additional data frame in the next time interval.

10. The distributed flow control system according to claim 9, wherein the leaky bucket flow control mechanisms of the multiple nodes further estimate a traffic availability for the next time interval for each leaky bucket, total the traffic availabilities of all of the multiple sources to determine a total traffic availability, and distribute the total traffic availability to each leaky bucket for use in determining a leaky bucket multiplier for the next time interval.

11. The distributed flow control system according to claim 10, wherein said leaky bucket flow control mechanisms include a master leaky bucket control mechanism that receives the traffic availabilities for the next time interval from each leaky bucket, that totals the received traffic availabilities to determine the total traffic availability, and that sends the total traffic availability to each leaky bucket.

12. The distributed flow control system according to claim 10, wherein each leaky bucket sends its traffic availability for the next time interval to each other leaky bucket and wherein each leaky bucket totals traffic availabilities received from other leaky buckets to determine the total traffic availability.

13. A distributed leaky bucket flow control method for controlling flow of data between multiple sources and a single destination within a GPRS network, said method comprising the steps of:

associating a respective one of a plurality of leaky buckets with each of the multiple sources, determining whether at least one logical link control (LLC) frame is available in a buffer associated with a particular leaky bucket among the plurality of leaky buckets, waiting for the at least one LLC frame to be available if the at least one LLC frame is not available, calculating an expected bucket level based on an assumption that one of the at least one LLC frame that is available were sent to the single destination if the at least one LLC frame is available, determining whether the expected bucket level is greater than a maximum size for the particular leaky bucket, delaying transmission of the at least one LLC frame if the expected bucket level is greater than the maximum size for the particular leaky bucket, if the expected bucket level is not greater than the maximum size:
 updating a current bucket level of the particular leaky bucket with the expected bucket level,
 updating a last LLC frame transmitted time with a current time, and
 sending the one of the at least one LLC frame to the single destination.

14. The method according to claim 13, wherein the method is a continuous method and the method steps are repeated.

* * * * *